United States Patent [19]

Stigsson

[11] Patent Number: 5,683,549
[45] Date of Patent: *Nov. 4, 1997

[54] PROCESS FOR THE PARTIAL COMBUSTION OF CELLULOSE SPENT LIQUOR USING TWIN FLUID NOZZLE BURNER

[75] Inventor: Lars Stigsson, Bjarred, Sweden

[73] Assignee: Chemrec Aktiebolag, Sweden

[21] Appl. No.: 298,582

[22] Filed: Aug. 31, 1994

Related U.S. Application Data

[63] Continuation of Ser. No. 952,875, filed as PCT/SE91/00346, May 16, 1991, Pat. No. 5,352,333.

[30] Foreign Application Priority Data

May 31, 1990 [SE] Sweden ............................ 90 01 959-7

[51] Int. Cl.$^6$ ................................. D21C 11/12
[52] U.S. Cl. ..................... 162/30.1; 162/30.1; 239/9; 239/416.5; 110/238
[58] Field of Search ................. 162/30.1, 31; 110/238; 239/416.5; 48/197 R, 209, DIG. 7

[56] References Cited

U.S. PATENT DOCUMENTS

3,323,858  6/1967  Guerrieri ............................ 23/48
4,762,532  8/1988  Lipp ................................. 48/197 R

OTHER PUBLICATIONS

Adams, T.N. "Kraft Recovery Boiler . . . Processes", American Paper Institute, 1988, pp. 22–25.

Primary Examiner—Donald E. Czaja
Assistant Examiner—Dean T. Nguyen
Attorney, Agent, or Firm—Ostrolenk, Faber, Gerb & Soffen, LLP

[57] ABSTRACT

The present invention is directed to a process for efficient combustion of cellulose spent liquors using a burner connected to a reactor, while supplying an oxygen containing gas, which invention is characterized in that more than 80% of the oxygen which is required for the partial combustion of the spent liquor is supplied through the lance of the burner to the reactor as an oxygen containing gas at a stoichiometric ratio of between 0.3 and 0.6 relative to complete combustion of the spent liquor.

18 Claims, 2 Drawing Sheets

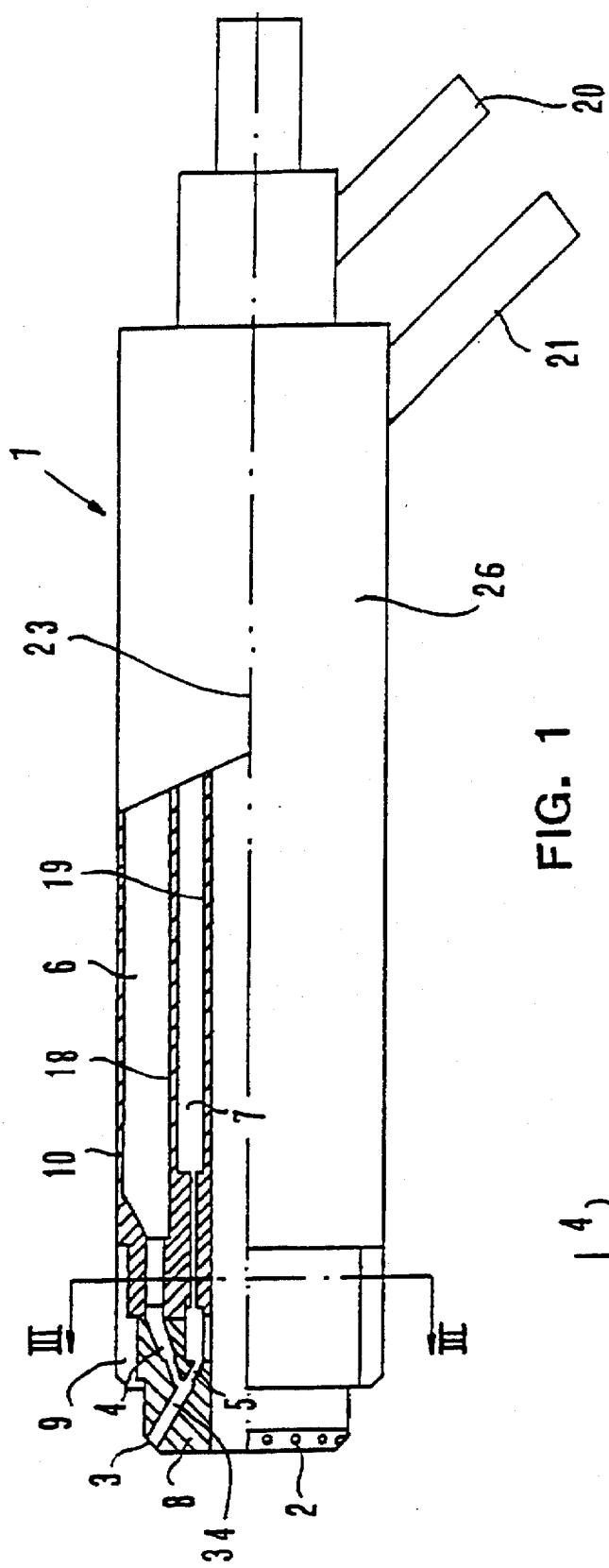
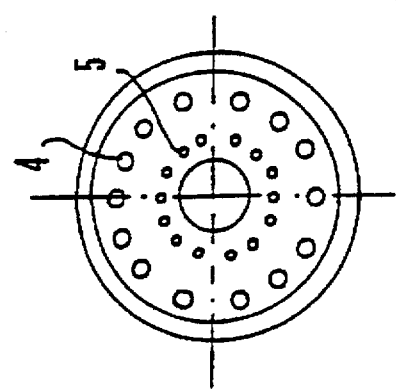
FIG. 1
FIG. 2

PROCESS FOR THE PARTIAL COMBUSTION OF CELLULOSE SPENT LIQUOR USING TWIN FLUID NOZZLE BURNER

This is a continuation of application Ser. No. 07/952,875, filed as PCT/SE/00346 May 16, 1991, now U.S. Pat. No. 5,352,333.

TECHNICAL FIELD

The present invention relates to a process for partial combustion of cellulose spent liquors from the cellulose industry using a burner connected to a reactor, while supplying an oxygen containing gas as the oxidant. The burner comprises a liquor lance equipped with a nozzle at its downstream end which supplies liquor and the greater part of the non-fuel related oxygen required for the partial combustion, wherein or in which proximity the oxygen-containing gas is brought into contact with the spent liquor which then disintegrates into a divergent spray.

The object of the present invention is to facilitate partial combustion of cellulose spent liquor through use of a burner creating a stable, self-igniting flame at low air/fuel ratios and elevated pressures.

BACKGROUND OF THE INVENTION

The cellulose industry generates spent liquors differing in composition according to the delignification process used. Within the sulphate pulping industry, spent liquor, commonly referred to as black liquor, contains valuable chemicals and energy in the form of combustible carbonaceous compounds. At the present time these chemicals and energy are normally recovered in a recovery boiler in which the black liquor is completely burned.

Partial combustion of black liquor in a gasification reactor as in the present invention generates a combustible gas comprising $H_2$, CO, $CO_2$, and droplets of molten inorganic chemicals.

In conjunction with pulp bleaching, a diluted liquor comprising organic matter and sodium salts is obtained. Mechanical and semi-chemical pulping processes also generate diluted liquors of different compositions. These as well as other waste and spent liquors generated in the cellulose industry can, after concentration, be used as a feedstock in the process of the present invention.

Although the following description describes the present invention as it applies to black liquor it is not restricted only to this particular liquor in its application.

The mechanisms related to partial combustion of black liquor are fairly well understood and are applied inter alia in the lower part of the soda recovery boiler. The difference between the present burner and a liquor burner in a soda recovery boiler is, however, great inter alia due to the low degree of liquor atomization in recovery boiler burners and the absence of a well-defined liquor flame. Another important difference between a recovery boiler burner and the burner of the present invention is that, the present burner is primarily intended for gasification at elevated pressures.

A major difference between the burner of the present invention and conventional oil burners is that a stable flame has to be formed with the use of a considerably lower amount of air or oxygen carrier.

As the exemplification below shows, black liquor as a fuel is characterized by a relatively low calorific value and high water and ash contents.

| | |
|---|---|
| Calorific value of the dry substance | 13 GJ/ton dry substance (DS) |
| Elementary composition | $C_{29}H_{34}O_{20}Na_9S_2$ |
| Dry solids content | 65% |
| Viscosity at 100° C. | 100 cSt. |

The presence of sodium compounds in the black liquor and its inherently high oxygen content make it a very reactive fuel, which means, provided an adequate burner is at hand, that the carbon conversion already in the flame zone becomes high, in spite of the fact that the combustion is substoichiometric.

The degree of atomization of the liquor is of great importance for obtaining a stable black liquor flame, the extension of the flame and high carbon conversion. The rheological properties of the black liquor are of significant importance to the degree of atomization which can be achieved in a given nozzle. The viscosity of the black liquor can be influenced by e.g. heating and/or the addition of additives. Normally the black liquor is being heated to above 100° C. for use in the present invention. The viscosity of the black liquor at the the moment of atomization should preferably be below 200 cSt.

Atomization of the black liquor can be further enhanced by flashing the liquor into the reactor in which case the liquor is preheated to a temperature above its boiling point at the operating pressure of the reactor.

Several types of atomizing nozzles are available but only a few varieties are suitable for atomizing cellulose spent liquors, such as black liquor, in the present invention.

"Twin-fluid" nozzles are most suitable for use in the present burner. A common feature of "twin-fluid" nozzles is that a relatively high gas flow rate is necessary for the supply of energy for the atomization. Another important feature of these nozzles is that the resulting size of the droplets decrease with increasing density of the atomizing gas. Depending on how the two fluid phases are brought together several mechanisms for forming droplets, such as shearing between ligaments, combination and formation of spheres of liquor droplets and high turbulence decomposition of the liquor spray can be anticipated.

DESCRIPTION OF THE PRESENT INVENTION

The present invention describes a process for efficient substoichiometric combustion of cellulose spent liquors, using a burner connected to a reactor, while supplying an oxygen containing gas, which invention is characterized in that the weight ratio between the oxygen containing gas supplied through the burner and the spent liquor supplied through the burner is lower than 2:1, and that at least half of the oxygen which is required for the partial combustion of the spent liquor is supplied through the burner to the reactor as an oxygen containing gas, said gas being discharged into the reactor through the nozzle.

Efficient atomization of the spent liquor is particularly important and is achieved in the burner of the present invention by direct contact between the spent liquor and the oxygen containing gas at elevated pressure in or directly adjacent to a nozzle designed specifically for that purpose. The spent liquor, which should be preheated to lower the viscosity before being fed to the burner, is supplied to the reactor through the liquor lance. At the downstream end of the liquor lance the liquor is brought into contact with an atomizing gas whereby the liquor flow velocity rapidly increases resulting in the formation of a divergent spray of atomized spent liquor.

As is mentioned above the spent liquor is a fuel with unusual properties regarding reactivity and ash and water contents. The spent liquor solids contains a high level of bound oxygen which means that the amount of oxygen which can be supplied through the combustion air is relatively small, particularly for partial combustion.

The oxygen supplied to the reactor corresponds to a stoichiometric ratio of between 0.3 and 0.6 relative to oxygen required for complete combustion of the spent liquor with a preferred ratio of between 0.35 and 0.5. The amount of air, oxygen-enriched air or oxygen to be supplied to the reactor is low in relation to the amount of spent liquor supplied. The weight ratio is lower than 2:1 when operating with air as oxidant and lower than 0.4:1 when operating with oxygen as oxidant. The greater part, and preferably more than 80% of the non-fuel bound oxygen which is required for partial combustion of the spent liquor is supplied to the reactor as an oxygen containing gas, which gas is discharged together with the liquor through the nozzle. The flow velocity of the oxygen containing gas in the nozzle should be between 40 m/s and 350 m/s.

The nozzle can be designed with a circular gap or a circular opening for discharge of spent liquor, wherein it is contacted with the high velocity atomizing oxygen containing gas and disintegrates into small droplets forming of a divergent spray. In an alternative design of the nozzle the spent liquor is discharged together with the atomizing gas through three or more symmetrically arranged openings.

Other aspects and advantages of the invention become apparent from the following more detailed description, taken in conjunction with the accompanying drawings.

BRIEF DESCRIPTION OF THE DRAWINGS

FIG. 1 is an axial sectional view of a first embodiment of the burner according to the invention comprising a nozzle and a liquor lance;

FIG. 2 is a sectional view of the burner of FIG. 1 along line III—III in FIG. 1;

DETAILED DESCRIPTION OF THE PREFERRED EMBODIMENTS

Figure 3:
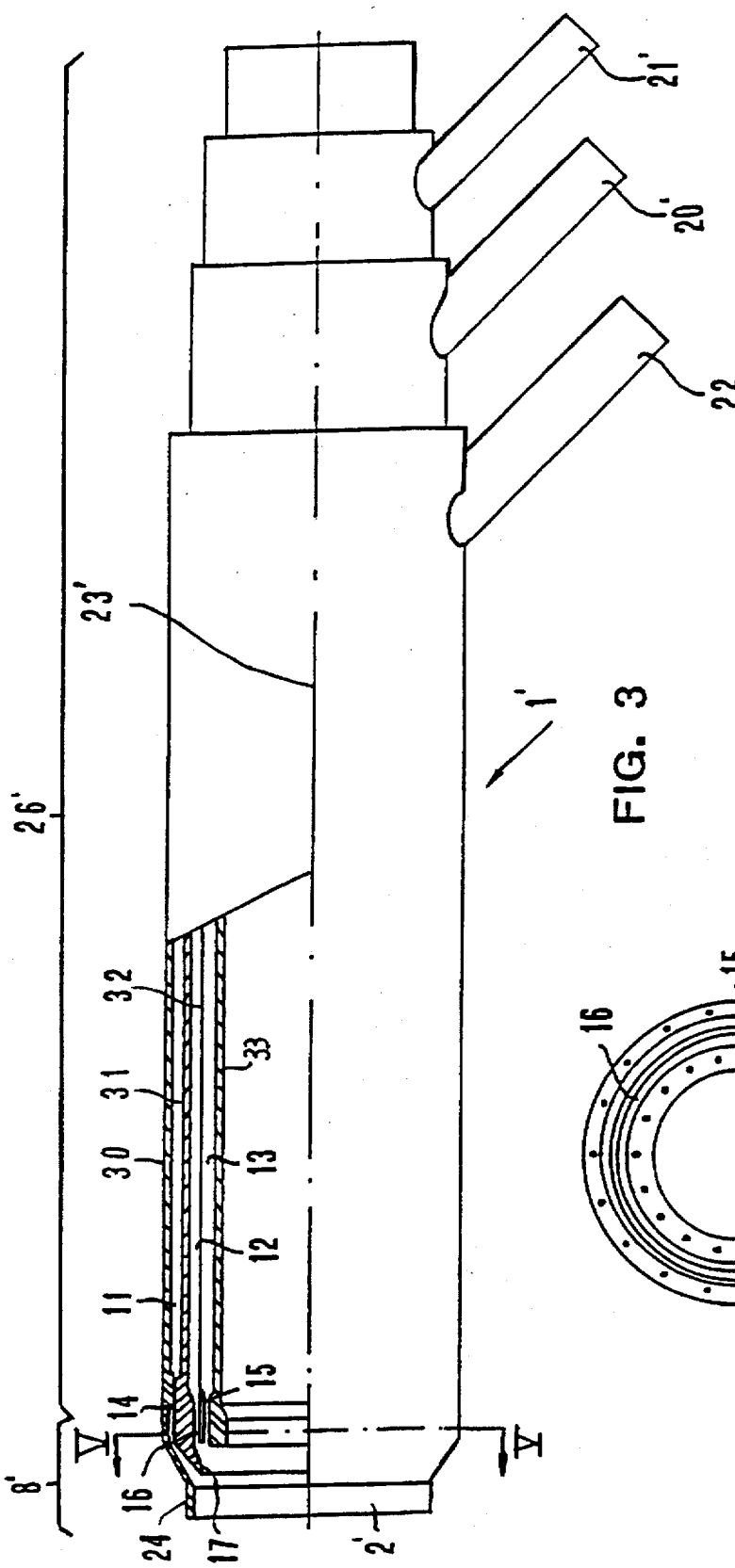
FIG. 3 is an axial sectional view of a second embodiment of the burner according to the invention comprising a nozzle and a liquor lance.

The burner 1 according to the invention shown in FIGS. 1 and 2 comprises a twin-fluid, substantially cylindrical liquor lance 26 and a nozzle 8 in which black liquor and gas are mixed. Nozzle 8 has the form of a Y-jet atomizer head of about rotationally symmetric shape. Its front face 2 is substantially flat and has a number of circular openings 3 equidistantly arranged along its chamfered circumferential front edge. From each opening 3 a bore 34 in nozzle 8 extends obliquely in respect of nozzle axis 23 in a way as to make their axes meet at a point on axis 23 inside of burner 1.

At a distance from openings 3 each bore 34 splits into two channels designated 4 and 5 extending to the rear side of nozzle 8 which fits snugly to the liquor lance portion 26 of the burner in the way described below.

The main portion of the liquor lance comprises an outer cylindric wall 10, an intermediate cylindric wall 18 and an inner cylindric wall 19 defining between them concentric spaces 6 and 7, respectively, extending over the entire length of the lance. Toward the end of the liquor lance portion 26 facing the rear side of nozzle 8 the radial width of concentric spaces 6 and 7 is reduced to about that of bores 4 and 5 at their respective rear side ends. By this arrangement and by making the front side of the liquor lance portion 26 and the rear side of the atomizer nozzle 8 fit each other snugly communication between concentric spaces 6 and 7 and, respectively, bores r and 5 is obtained.

The atomizer nozzle 8 is held attached to the liquor lance portion 26 by an annular hood 9 fitted to outer liquor lance wall 10.

At its rear end nozzle 1 is provided with black liquor and air inlet tubes 20, 21 communicating with concentric spaces 6 and 7, respectively. Black liquor and air fed into nozzle 8 will mix at the Y-junction of the Y-jet atomizing nozzles and then be forced under high pressure through the symmetrically arranged circular openings 3.

Figure 4:
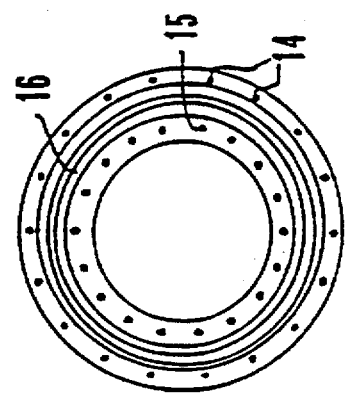
FIG. 4 is a sectional view of the burner of FIG. 3 along line V—V in FIG. 3.

FIGS. 3 and 4 show another embodiment of the burner 1' according to the invention having a liquor lance portion 26' with three concentric annular spaces 11 (outer), 12 (central), 13 (inner). Concentric spaces 11,12,13 are defined by cylindric walls 30,31 (11), 31,32 (12), and 32,33 (13). Through inlet pipes 20',21',22 arranged near the rear end of liquor lance portion 26', air (through pipes 21', 22) is fed into annular spaces 11 and 13, and black liquor (through pipe 20') is fed into annular space 12.

The burner 1' of FIGS. 3 and 4 instead of a separate atomizer head has a downstream frontal atomizer portion 8' integral with the liquor lance portion 26'. Near its downstream end annular space 12 narrows to form a circular gap 16 while outermost and innermost annular spaces 11, 13 merge with two sets of narrow bores 14 and 15, respectively, the eighteen bores of the respective sets being arranged equidistantly from nozzle axis 23' and evenly spaced from each other, as seen in the sectional view of FIG. 4. Gap 16 and bores 14,15 open at the front side 2' of the substantially cylindric nozzle portion 8'.

The frontal end portions of cylindric walls 30 and 31, respectively, are drawn inwardly in direction of axis 23' to form annular lips 17, 24. By lip 17 the black liquor fed through the narrow gap 16 as a thin film is forced inwards and atomized by meeting the air emerging from holes 15. This flow of primary air-black liquor mixture is met by additional air emerging from holes 14 and deflected inwards (towards the center axis of the nozzle) by lip 24, thereby creating a diverging jet of finely dispersed black liquor.

When designing burners great attention has to be paid to the weight ratio between oxidant and fuel.

Different fuels contain different amounts of chemically bound oxygen. Bitumenous coal usually contains between 4–10% of bound oxygen. Fuel oils contain less than 1% of bound oxygen.

Black liquor dry solids contains about 35% by weight of bound oxygen calculated on dry, matter. This affects the design of burners for combustion of black liquor since a considerably lower amount of oxygen, air or oxygen enriched air has to be added to the reactor to obtain the desired level of combustion.

The air/fuel ratio (by weight) for some fuels at stoichiometric combustion are exemplified below:

| | | |
|---|---|---|
| Anthracite | Air/fuel | 10–12:1 |
| Ethyl alcohol | Air/fuel | 9:1 |
| Black liquor | Air/fuel | 4–5:1 |
| Diesel oil/heavy oil | Air/fuel | 13–15:1 |

The burner designed in the present invention creates a stable flame in a reactor which preferably operates at pressures in the range of 0.1 to 150 bars above ambient and at temperatures in the range of 700° to 1400° C.

Depending on factors such as temperature and flow velocities in the burner and the composition of the liquor, the burner nozzle can in addition to thermal effects be subjected to oxidation and reactions with sulphur which may have a detrimental effect on the degree of atomization. The burner nozzle of the present invention should therefore preferably be cooled by a circulating liquid.

A preferred embodiment of the present invention is to use oxygen or oxygen enriched air as the oxidant. In such a preferred embodiment all or nearly all the the oxygen required for partial combustion is supplied through the nozzle to support atomization of the spent liquor.

Part of the oxygen containing gas may be added to the reactor through a pipe arranged coaxially around the liquor lance or through one or several gates. To compensate for the low air/fuel ratios and to achieve reasonable gas velocities all of the oxygen containing gas should be preheated to at least 100° C., preferably to 300° C., and it should further be given a vortex movement which, i.a., can be achieved by passing the gas through vortex blading arranged in the coaxial pipe. The radial flow rate of the oxygen containing gas is thereby markedly affected with a maintained axial flow rate. The main principle of a vortex burner is to recirculate a portion of gases through an internal recirculation zone towards the liquor lance. This internal recirculation zone facilitates combustion and stabilizes the frame and the recirculated hot gases add energy for ignition of the liquor spray. The internal recirculation zone also serves as a depot for heat and reactive gas components.

I claim:

1. Process for partial combustion of cellulose spent liquors in a reactor equipped with a burner comprising a liquor lance and an atomizing nozzle having a downstream front side, said process comprising:

(a) feeding, separately of each other, an oxygen containing gas and spent liquor through said lance to said atomizing nozzle, (b) atomizing the spent liquor by contacting it with said oxygen containing gas for forming a spray of atomized spent liquor emanating from the nozzle to sustain a flame in the reactor, wherein said oxygen containing gas comprises more than 80% of the oxygen required for the partial combustion, said oxygen required for partial combustion being supplied to the reactor at a stoichiometric ratio of from 0.3 to 0.6 relative to the oxygen needed for complete combustion of the spent liquor.

2. The process according to claim 1, further comprising the step of directing the atomizod spent liquor in a forwardly direction with respect to the atomizing nozzle.

3. The process according to claim 1, wherein said ratio is from 0.35 to 0.5.

4. The process according to claim 1, further comprising the step of ejecting the atomized spent liquor from the nozzle at the front side of the nozzle.

5. The process according to claim 1, wherein the spent liquor is atomized at the front side of the nozzle, and further comprising the step of contacting the spray of atomized spent liquor with an additional stream of oxygen containing gas which emerges separately from the nozzle at its front side.

6. The process according to claim 5, further comprising the step of directing said stream of additional oxygen containing gas to converge towards the center axis of the nozzle.

7. The process according to claim 1, wherein the liquor emanating from the nozzle has a temperature above 100° C.

8. The process according to claim 7, wherein the liquor emanating from the nozzle has a temperature above 300° C.

9. The process according to claim 8, wherein the liquor emanating from the nozzle has a temperature above its boiling point at the prevailing reactor pressure.

10. The process according to claim 1, wherein the contacting of the spent liquor with the oxygen containing gas occurs in the nozzle.

11. The process according to claim 1, wherein the contacting of the spent liquor with the oxygen containing gas occurs adjacent to the front side of the nozzle.

12. The process according to claim 1, further comprising the step of providing the oxygen containing gas with a vortex movement prior to contacting it with the spent liquor.

13. The process according to claim 1, wherein said oxygen containing gas has a velocity in the nozzle of between 40 meters per second and 350 meters per second.

14. Process for partial combustion of cellulose spent liquors in a reactor equipped with a burner comprising a liquor lance and a symmetric atomizing nozzle having a downstream front side, said process comprising:

(a) feeding, separately of each other, an oxygen containing gas and hot spent liquor through said lance to said atomizing nozzle, the spent liquor having a temperature above 100° C., (b) atomizing the spent liquor by contacting it with said oxygen containing gas for forming a spray of atomized spent liquor emanating from the nozzle to sustain a flame in the reactor, wherein the oxygen in the oxygen containing gas comprises more than 80% of the oxygen required for the partial combustion, said oxygen required for partial combustion being supplied to the reactor at a stoichiometric ratio of from 0.3 to 0.6 relative to the oxygen needed for complete combustion of the spent liquor.

15. The process according to claim 14, further comprising the step of directing the atomized spent liquor in a forwardly direction with respect to the atomizing nozzle.

16. The process according to claim 14, wherein the contacting of the spent liquor with the oxygen containing gas occurs in the nozzle.

17. The process according to claim 14, wherein the contacting of the spent liquor with the oxygen containing gas occurs adjacent to the front side of the nozzle.

18. The process according to claim 14, further comprising the step of providing the oxygen containing gas with a vortex movement prior to contacting it with the spent liquor.

* * * * *